US008972487B2

(12) United States Patent
Todorova et al.

(10) Patent No.: US 8,972,487 B2
(45) Date of Patent: Mar. 3, 2015

(54) AUTOMATED FRAMEWORK FOR TESTING ENTERPRISE SERVICES CONSUMER TECHNOLOGIES

(75) Inventors: Mariela Todorova, Sofia (BG); Chavdar Baikov, Sofia (BG); Dimitar Angelov, Sofia (BG)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 13/196,941

(22) Filed: Aug. 3, 2011

(65) Prior Publication Data
US 2013/0036156 A1 Feb. 7, 2013

(51) Int. Cl.
G06F 15/16 (2006.01)
H04L 12/26 (2006.01)
H04L 29/08 (2006.01)
H04L 12/24 (2006.01)

(52) U.S. Cl.
CPC .............. *H04L 43/50* (2013.01); *H04L 67/02* (2013.01); *H04L 41/0273* (2013.01)
USPC .......................................... 709/203; 709/222

(58) Field of Classification Search
None
See application file for complete search history.

(56) References Cited

U.S. PATENT DOCUMENTS

| 7,822,826 | B1 * | 10/2010 | Savchenko et al. ........... 709/217 |
|---|---|---|---|
| 2006/0150026 | A1 * | 7/2006 | Kolawa et al. .................. 714/38 |
| 2007/0022154 | A1 * | 1/2007 | Saunders et al. .............. 709/201 |
| 2008/0059558 | A1 * | 3/2008 | Singh et al. .................... 709/202 |
| 2008/0155356 | A1 * | 6/2008 | Boskovic et al. ................ 714/45 |
| 2008/0250051 | A1 * | 10/2008 | Grechanik et al. ............. 707/102 |
| 2009/0037884 | A1 * | 2/2009 | Benameur et al. ............. 717/126 |
| 2009/0235172 | A1 * | 9/2009 | Gandhi et al. ................. 715/733 |
| 2009/0282136 | A1 * | 11/2009 | Subramanian ................ 709/222 |
| 2010/0050167 | A1 * | 2/2010 | Bibr et al. ...................... 717/168 |
| 2010/0318974 | A1 * | 12/2010 | Hrastnik et al. ............... 717/135 |

OTHER PUBLICATIONS

Bianculli, Domenico et al., Automated Performance Assessment for Service-Oriented Middleware: A Case Study on BPEL Engines, Apr. 2010, International World Wide Web Conference Comittee (IW3C2), WWW 2010, pp. 141-150.*

* cited by examiner

*Primary Examiner* — Jason K. Gee
*Assistant Examiner* — Maung Lwin

(57) ABSTRACT

Various embodiments of systems and methods for automated test framework for testing enterprise services consumer technologies are described. According to one aspect, an enterprise service client is generated based on the WSDL document of an enterprise service. The generation of the client includes generation of source code files and other client artifacts. The client artifacts are compiled and the client is configured to connect to the server system hosting the enterprise service. Real test data is loaded into a non-persistent memory and executed against the server system of the enterprise system. If no exception occurs, the test call is assumed successful. If the test calls to this enterprise service are successful, the service is marked as compatible with the different clients that performed the test calls.

20 Claims, 7 Drawing Sheets

AUTOMATED FRAMEWORK FOR TESTING ENTERPRISE SERVICES CONSUMER TECHNOLOGIES

FIELD

The field generally relates to the software arts, and, more specifically, to methods and systems including an automated framework for testing enterprise services consumer technologies.

BACKGROUND

Web services are Web-based interfaces that can be integrated into business scenarios of a company based on open and commonly accepted standards. Using Web services enables a user to combine functions implemented on different software components into a single process. Web services are self-contained, modularized, executable entities that can be published, searched for, and accessed across a network. For a caller or sender, a Web service is a black box that may require input and delivers a result. Companies can extend their solutions by exposing and integrating Web services.

Web services can be exposed from a server side of a client-server communication and consumed by the client side of the client-server communication. The Web services are consumed by Web services clients (or proxies). The Web services clients need to be compatible with the Web services they are consuming. However, the Web services clients can be implemented in different platforms and programming languages than the Web services themselves. For example, the Web services clients can be implemented in Java, ABAP, .NET, and so on, while the Web services can be created in Java only. The different Web services consumers (clients) have to interoperate with the exposed Web services. Thus, all exposed Web services from the server side have to be tested for interoperability with the Web services clients on the client side based on the different technologies. The provided Web services by a vendor could be hundreds and testing each single Web service's interoperability with a given Web service client could take enormous amount of time and the efforts may need to be repeated each time a change is introduced in the Web services.

SUMMARY

Various embodiments of systems and methods for automated framework for testing enterprise services consumer technologies are described herein. In various embodiments, the method includes receiving a Web Service Definition Language (WSDL) list file that includes at least: a WSDL URL that points to a WSDL document of an enterprise service, at least one set of real test data for the enterprise service, and access data to a server system hosting the enterprise service. A client is generated based on service metadata obtained from the WSDL document of the enterprise service. The method automatically configures the client to connect to the server system hosting the enterprise service via the access data from the WSDL list file. Further, the method loads the at least one set of real test data for the enterprise service in memory and invokes the enterprise service from the configured client to test compatibility between the enterprise service and the client based on the at least one set of real test data.

In various embodiments, the system includes a processor and a memory in communication with the processor. According to one aspect, the memory includes a WSDL list file folder that stores at least: a WSDL URL that points to a WSDL document of an enterprise service, at least one set of real test data for the enterprise service, and access data to a server system hosting the enterprise service. The memory also includes a test framework to test compatibility between the enterprise service and a client based on the at least one set of real test data. Further, the test framework comprises a client generator that generates the client for the enterprise service based on service metadata obtained from the WSDL document of the enterprise service. A client configurator is also included that configures the generated client into a configured client, wherein the configuration includes specifying the access data to the server system hosting the enterprise service. Finally, a client invoker loads the at least one set of real test data from the WSDL list file into a non-persistent memory and invokes the enterprise service with the loaded at least one set of real test data.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for automated framework for testing enterprise services consumer technologies are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiment.

In various embodiments, methods and systems provide an integrated, easy-to-use, and enhanced framework for testing Web services consumer technologies. Web services are used for loosely-coupled communication between two systems, such as a client system and a server system. The systems may be implemented in and supporting any combination of different technologies (for example, Java, .NET, ABAP, and so on). Thus, the client system can support Java technologies and the server system can support .NET technologies, or both systems can support Java, for example. Any combination of the different technologies is applicable to the methods and system for the integrated, easy-to-use, and enhanced framework for testing Web services consumer technologies. The framework tests automatically the interoperability of the provided Web services by the server system (or backend system) with Web services clients (or consumers) on the client system based on different technologies.

Figure 1:
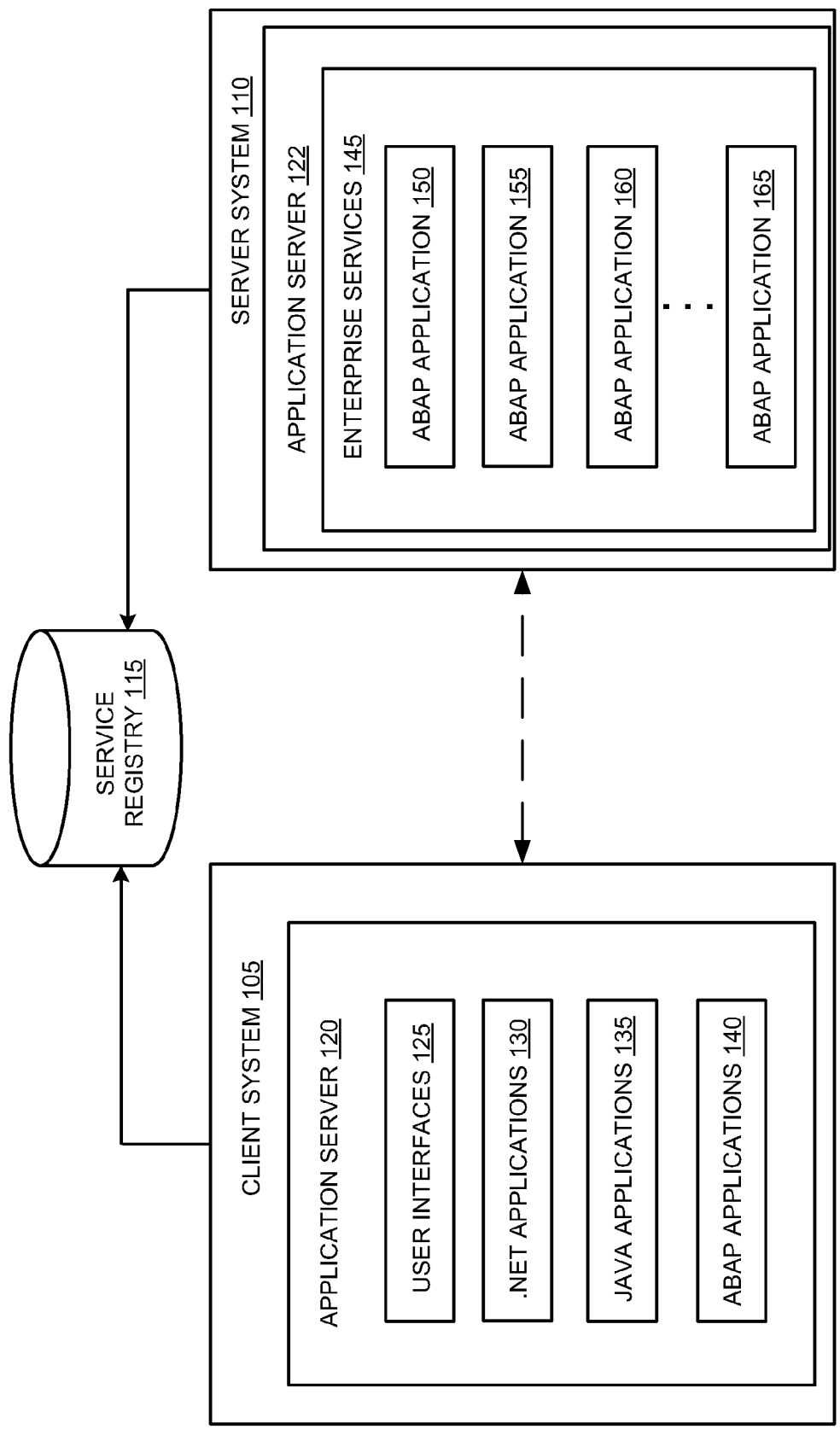
FIG. 1 is a block diagram illustrating methods and systems for consuming enterprise services exposed from a server system by a client system.

FIG. 1 is a block diagram illustrating methods and systems for consuming enterprise services exposed from a server system by a client system. Server system 110 communicates with client system 105. In some embodiments, the client system 105 and the server system 110 are located on one physical machine; in other embodiments, the client system 105 and the server system 110 are located on separate physical machines communicating via a network (e.g., the Internet) using different protocols. Providing and consuming Web services is performed via XML-based protocols, such as Simple Object Access protocol (SOAP). In case, the client system 105 and the server system 110 are located on separate physical machines, the XML-based protocol is used over a network protocol such as HTTP/HTTPs. In various embodiments, both the server system 110 and the client system 105 include an application server that provides an environment for running software applications. Client system 105 includes application server 120 and server system 110 includes application server 122. The server system 110 may include a development environment for developing some of the applications, configuring the applications, providing applications as Web services, etc. The application server 120 in the client system 105 is more client-oriented, it may include a development environment for developing client applications, generating Web services proxies, and so on.

In some embodiments, application server 120 includes a set of client business applications developed for client system 105. The application server 120 may also include a set of user interfaces 125 for these business applications. The set of client business applications may include applications developed according to application server 120 and supporting different technologies such as .NET applications 130, Java applications 135, ABAP applications 140, and so on. In various embodiments, the application server 122 includes a set of enterprise services 145. Enterprise services 145 represent business applications configured as Web services. These business applications can be developed in any technology supported by the server system 110. It should be noted that the enterprise services 145 of application server 122 include ABAP applications such as ABAP application 150, ABAP application 155, ABAP application 160, and ABAP application 165 for illustrative purposes only. The enterprise services 145 can be developed in any other technology. For each of the set of enterprise services 145, a client application from the set of client business applications has been specifically developed to consume that given enterprise service with its specific data.

The set of client business applications is built based on the provided interfaces (e.g., a Web service interface) by the set of enterprise services 145. An enterprise service interface is described via an eXtensible Markup Language (XML) document called a Web Service Definition Language (WSDL) document. The WSDL of the enterprise service fully and synonymously describes the rules and requirements to the client application (e.g., a Web service proxy). The WSDL includes metadata such as: 1) an enterprise service endpoint—the point where the enterprise service could be invoked; 2) the name of the enterprise service; 3) the methods of the enterprise service with all the input and output parameters and expected exceptions that the business logic could throw; and so on. The endpoint in the WSDL document is an access point that describes the URL of the host where the enterprise service is located and the port of that host.

Based on the WSDL document, the client application (e.g., Java applications 135) could be generated. That includes generation of the corresponding source code files and other artifacts. The source code files need to be compiled and prepared to be invoked with the enterprise service call. Once the artifacts are ready, the test data is loaded and properly executed against the real server systems hosting the enterprise (Web) services. Security credentials are provided and used for the real invocation. Once the call is performed, if no exception occurs, the test call is assumed successful. If all the test calls to an enterprise service are successful, the enterprise service is marked as compatible to be used not only by the given technology of the consuming client, but by other technologies as well.

In various embodiments, enterprise services 145 can be published in a service registry 115. The service registry 115 contains definitions (WSDLs) of enterprise services 145 and references to their metadata. The published enterprise services 145 can be classified with the help of taxonomies and searched by these classification criteria. In some embodiments, the WSDLs of the enterprise services 145 are described and listed in a separate file, a WSDL list file, on the server system 110. The file may be in an XML format. The file includes the URLs to the WSDL files, via which the WSDL files can be located and obtained. In case the WSDLs are stored in service registry 115, the URLs point to the machine hosting the service registry 115.

In some embodiments, business data used by the enterprise services 145 is collected for some periods of time and stored in a file on the server system 110. This business data has been stored in a format as test data for future test purposes. For example, a user creates a client application for an enterprise service through which connects to server system 110 to consume the enterprise service; the underlying application exposed as the enterprise service uses some business data, which is being collected and stored as test data. In this way, real business data that proved to be correct in real business scenarios can be reused in some testing scenarios. This business data can also be regarded as real test data. In some embodiments, real test data is collected and stored for at least some of the enterprise services 145. For an enterprise service, there may be more than one set of real test data. In this case, the test framework may perform test scenarios with at least one of the sets of real test data. The real test data is included in the WSDL list file with the WSDL URLs.

In some embodiments, server system 110 may be a cluster of server systems, where a server system in the cluster may host one part of the enterprise services 145 and other server system to host some other part of the enterprise services 145. In this case, for each enterprise service the following details should be registered: host and port of the server system hosting the enterprise service; URL, user name, and password for access to the enterprise service. Thus, when a request for a given enterprise service is received, the correct enterprise service will be invoked. These details are included in the WSDL list file with the WSDL URLs and the real test data.

Figure 2:
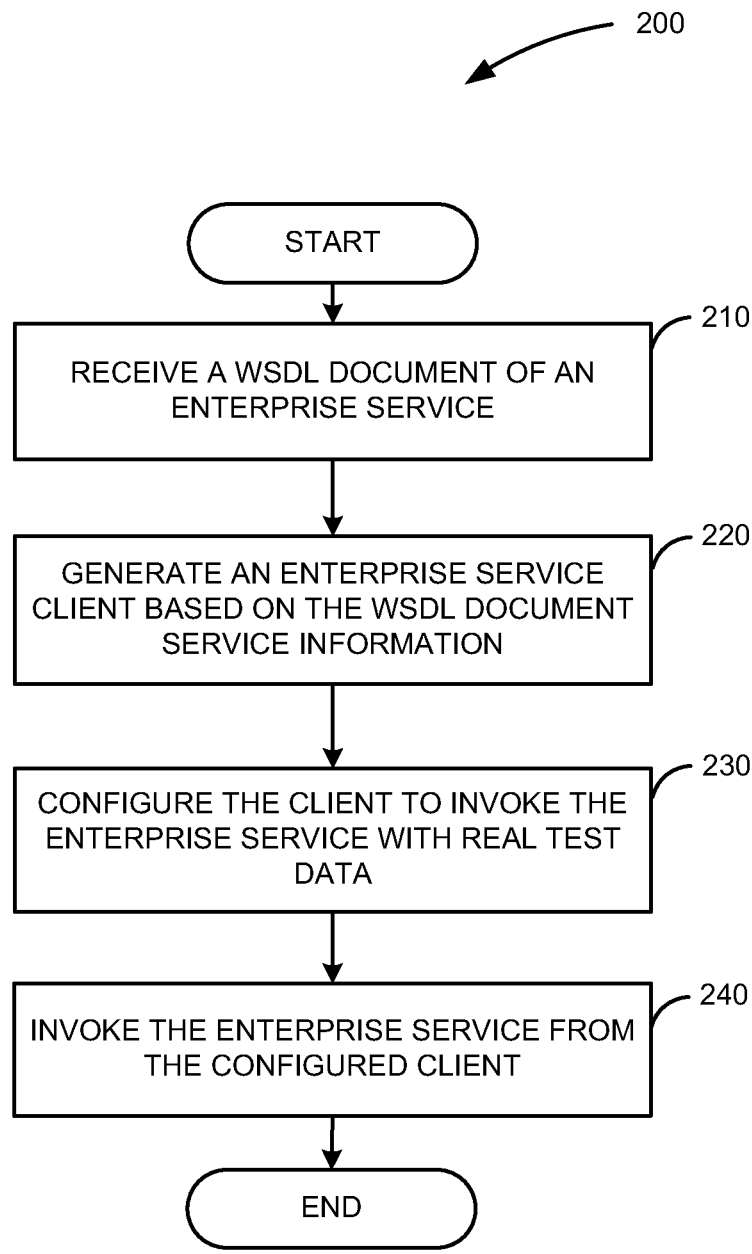
FIG. 2 is a flow diagram illustrating a method for invoking an enterprise service from a client application using real test data.

FIG. 2 is a flow diagram illustrating a method for invoking an enterprise service from a client application using real test data. Method 200 includes the main steps for testing the invocation of an application provided as an enterprise service with a set of real test data. The invocation of the enterprise service is performed by a client application. The testing checks if the invocation of the enterprise service returns an expected result with the proper real test data. The testing is performed by a test framework. The test framework can be located either on the server system 110 or on the client system 105. At block 210, a WSDL document of an enterprise service is received at the test framework. In various embodiments, the WSDL document can be obtained by searching the service registry 115. Since the WSL document describes the metadata of the enterprise service (service metadata), a client can be generated to invoke this enterprise service. The WSDL metadata includes the name of the enterprise service and the methods of the enterprise service with all the input and output parameters and expected exceptions. At block 220, an enterprise service client is generated based on the WSDL document service information. The client is generated to invoke this exact enterprise service with the methods (operations) and their corresponding input and output parameters specified in the WSDL, and expected exceptions.

At block 230, the client is automatically configured to invoke the enterprise service. The configuration of the client includes specifying host, port, URL, and user name and password information to connect and access the enterprise service. This information is obtained automatically from the WSDL list file provided by the server system 110. Since the WSDL list file includes real test data, the configuration of the client is performed with real test data as well. At block 240, the enterprise service is invoked with real test data from the configured client. If no exception occurs, the test scenario is assumed successful. If different test scenarios to this enterprise service are successful, e.g., test scenarios based on client applications developed in different technologies, then the enterprise service is marked as compatible and can be consumed by the corresponding technologies for which it was tested.

Figure 3:
FIG. 3 is a block diagram illustrating the method of creating a configured client by the test framework, according to an embodiment.

FIG. 3 is a block diagram illustrating the method of creating a configured client by the test framework, according to an embodiment. After the WSDL document is obtained and received at the test framework, an enterprise service client is generated. The client is created to invoke a specific enterprise service with the methods and their corresponding input and output parameters specified in the WSDL, and expected exceptions. In result of generating the client, a storage unit 310 on the file system 305 is created. In various embodiments, storage unit 310 is a folder including a set of files 315. The set of files 315 may include: source code files (e.g., Java files), XML files, and so on. The set of files 315 is compiled via a compiler of the test framework. In result of the compilation, an abstract entity representing the client is generated and stored on the file system 305. This abstract entity is abstract client entity 320. At this point, abstract client entity 320 is not configured for a specific enterprise service. In some embodiments, abstract client entity 320 is located somewhere on file system 305. File system 305 may be a file system of a server system 110, a file system of a server system in a cluster environment, or a file system of a client system (such as client system 105).

In other embodiments, abstract client entity 320 is created as an enterprise archive entity that needs to be deployed on application server 122 of server system 110. In case, the abstract client entity 320 is created as an archive entity and the enterprise services that need to be consumed are several hundred that will require several hundred archive entities to be deployed on server system 110, which will overload the server system 110 and decrease its performance. In case, the abstract client entity 320 is stored on the file system 305, no deployment is needed on the server system 110 and the memory is not overloaded.

In various embodiments, the abstract client entity 320 may be located remotely from the enterprise service. Therefore, the abstract client entity 320 has to be configured to access the machine hosting the enterprise service with proper information. The configuration of the abstract client entity 320 includes specifying: the host and port data of the correct machine, URL of the correct enterprise service, user name and password for security authorization, and so on. The test framework automatically performs the configuration of abstract client entity 320 by obtaining the necessary information from the WSDL list file provided by the server system 110. After the configuration of the abstract client entity 320, the abstract client entity 320 is transformed and saved as a configured client 325 on the file system 305, in the same storage unit 310. The configured client 325 is ready to invoke the enterprise service with the access data specified during configuration of the abstract client entity 320.

Figure 4:
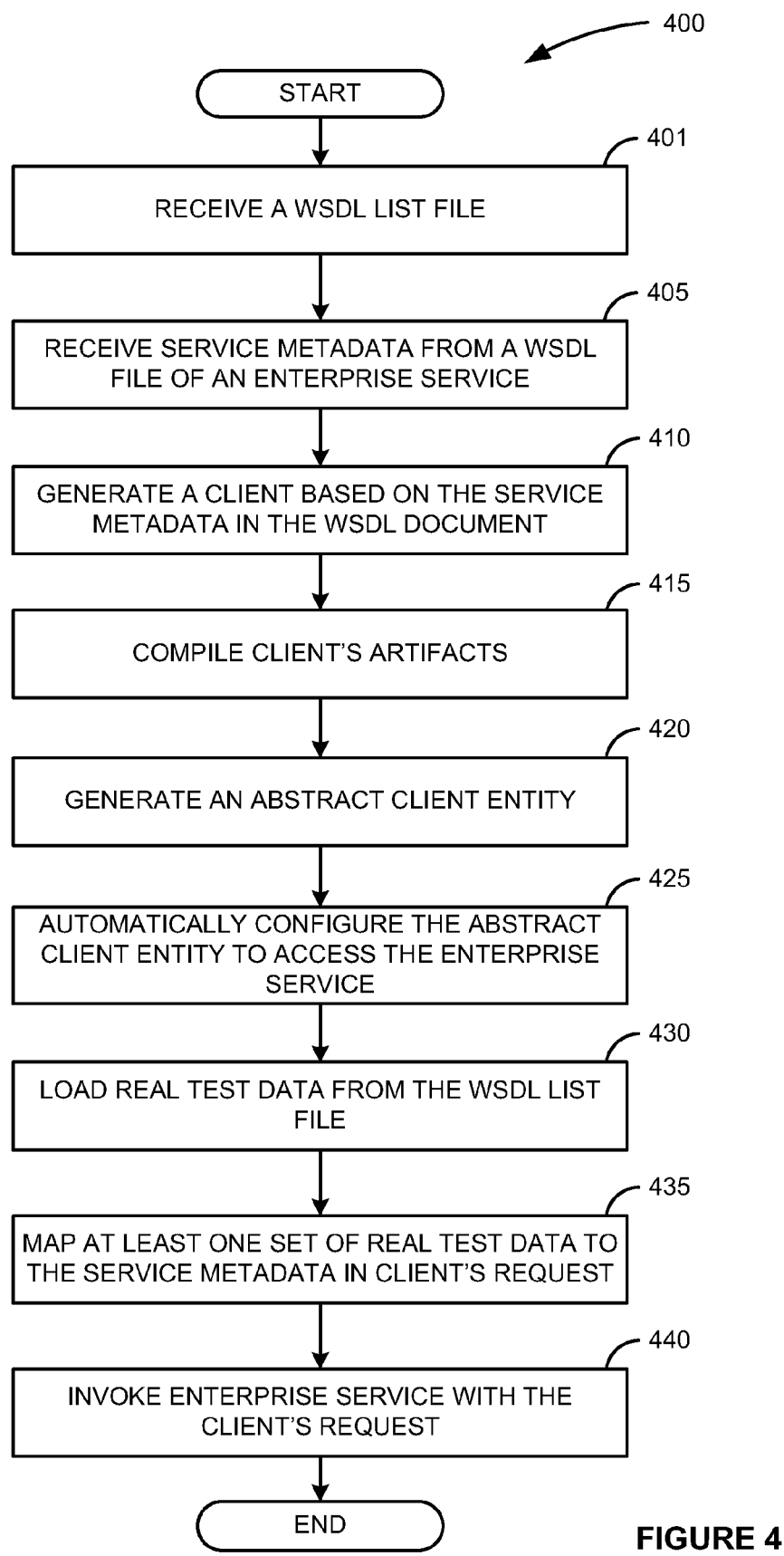
FIG. 4 is a flow diagram illustrating a method for invoking an enterprise service from a configured client via a test framework, according to an embodiment.

FIG. 4 is a flow diagram illustrating a method for invoking an enterprise service from a configured client via a test framework, according to an embodiment. Process 400 describes testing enterprise services for compatibility and interoperability with clients developed in different technologies, such as Java, ABAP, .NET, and so on. The clients can be hosted on one physical machine (for example, a double-stack application server supporting Java on one stack and ABAP on the other stack) or on different physical machines. The clients are created to consume a set of enterprise services hosted on one or many server systems. The testing is performed via a test framework that can be located on any of the client or server systems. At block 401, a WSDL list file is received at the test framework. The WSDL list file includes a list of URLs to the WSDL documents of the plurality of enterprise services. Further, the WSDL list file includes real test data collected and stored during execution of real scenarios with real input and output data. The WSDL list file also includes access data to the machine hosting the enterprise service such as host, port, URL, user name and password, and so on.

At block 405, service metadata from a WSDL file of a specific enterprise service is received. The service metadata from the WSDL file is received by obtaining the WSDL document of the enterprise service via a WSDL URL from the WSDL list file. The service metadata includes data such as: name of the enterprise service, at least one operation of the enterprise service, input and output parameters for the operation, expected exceptions, and so on. At block 410, a client is generated for the enterprise service, which WSDL document was obtained from the WSDL URL. The client is generated based on the received service metadata for the enterprise service. Thus, the client is specifically generated to request this enterprise service with at least one operation, with the corresponding input and output parameters, and to expect a given exception. After the client is generated, a folder 310 on the file system 305 is created storing client artifacts. The client artifacts may include source code files (e.g., Java files), XML descriptive files, etc.

At block 415, the client's artifacts are compiled. In response to the compilation, an abstract client entity of the enterprise service client is generated as an enterprise service client application, at block 420. At this point, the abstract client entity (or just client) does not know the machine on which the enterprise service is located and any security access credentials. In various embodiments, the abstract client entity is located somewhere on the client or server system and it needs to request the enterprise service locally or remotely. For remote invocation of the enterprise service, location and access information needs to be provided. At block 425, the abstract client entity is automatically configured to access and connect to the machine hosting the enterprise service by specifying access information such as host, port, URL, user name and password for the enterprise service. The access information is obtained from the WSDL list file for the given enterprise service. Although, the endpoint information in the WSDL document of the enterprise service may contain such access information, in some scenarios the client may invoke the enterprise service on a different system than specified in the WSDL or the enterprise service may be relocated to another system. Thus, the WSDL document is mainly used for obtaining the metadata (e.g., the service metadata), while the real access data is automatically obtained by the test framework from the WSDL list file.

At block 430, real test data is loaded from the WSDL list file. The real test data is needed for the client application to invoke the enterprise service and more specifically, to invoke at least one of the set of operations defined in the service metadata with the corresponding input parameters and output parameters. The input parameters should be of a defined type in the metadata and their values to meet certain requirements. For example, if an input parameter is of type "date" such as a birth date for a person, it is necessary not only the value of the parameter to be in the correct format, but also the value to be in a certain range, e.g., above year 1900. Thus, it is important the data used for the test scenarios by the test framework to be real test data. The real test data is stored in a specific format suitable for test purposes and listed in the WSDL list file. In various embodiments, the real test data is collected and stored in at least one set of real test data per enterprise service. One set of real test data includes the data used in one real scenario executed on the enterprise service.

At block 435, at least one set of real test data is mapped to the input parameters and output parameters of the service metadata obtained from the WSDL document in the client's request. At block 440, the enterprise service is invoked by the client application with the client's request. If the invocation of the enterprise service by the client application returns the expected result, the test is successful and the client application is proven to be compatible with the enterprise service. Following the steps of process 400, all available enterprise services can be automatically tested for compatibility with different enterprise services client technologies. The test framework obtains the service data from the WSDLs of a plurality of available enterprise services, creates the corresponding amount of clients and folders with client artifacts on the file system, complies the clients artifacts, and configure the generated client applications. Then, the test framework loads the sets of real test data for the plurality of enterprise services from the WSDL list and invokes the enterprise services with the corresponding real test data one by one.

Figure 5:
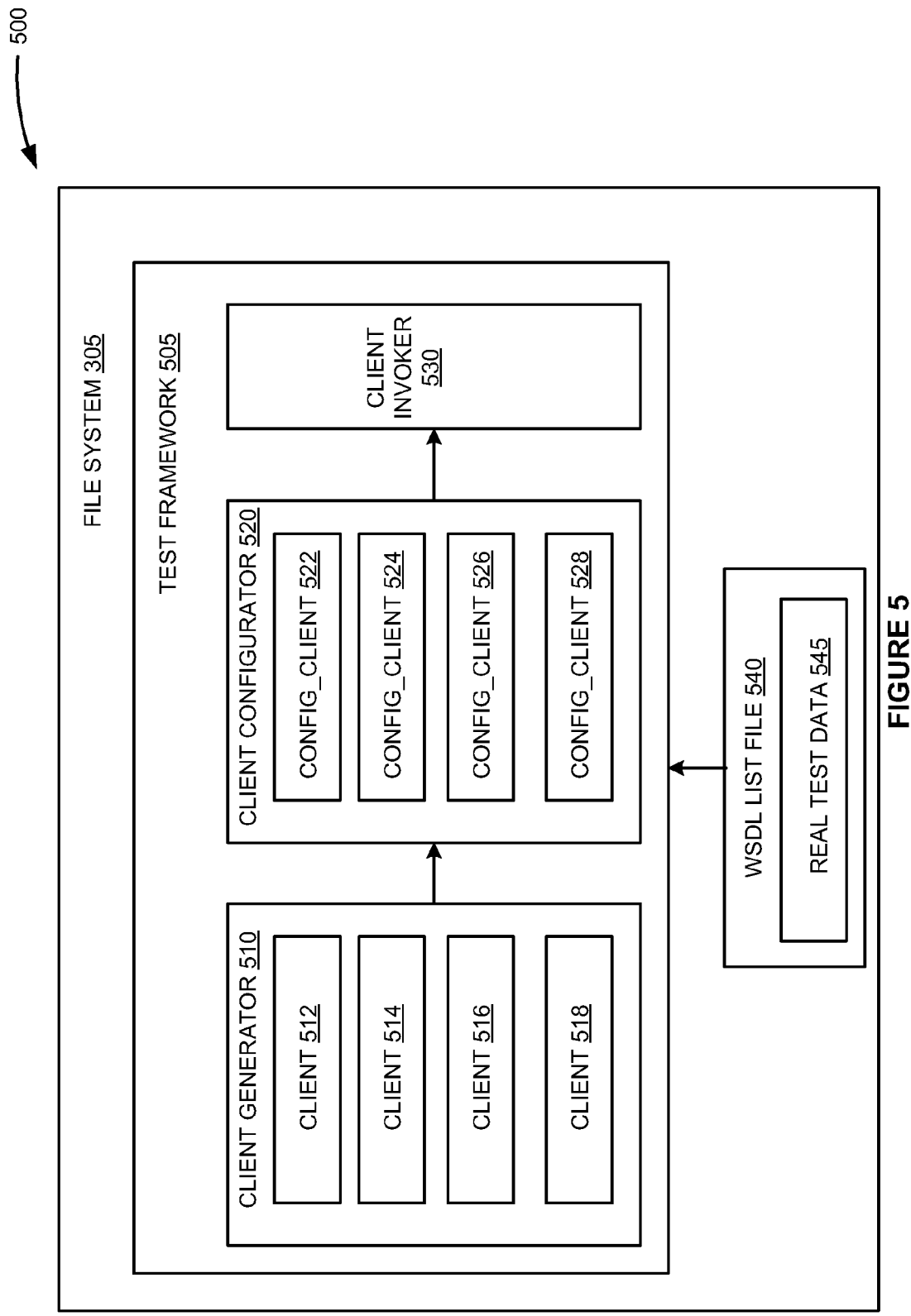
FIG. 5 is a block diagram illustrating a file system with a test framework for invoking an enterprise service from a client application, according to an embodiment.

FIG. 5 is a block diagram illustrating a file system with a test framework for invoking an enterprise service from a client application, according to an embodiment. In various embodiments, system 500 includes a test framework 505 located on file system 305 in a client system or a server system. Test framework 505 includes set of components for executing tests to test automatically the compatibility of at least one enterprise service and at least one enterprise service client developed in the same or different technology. Test framework 505 includes a client generator 510 that generates a plurality of enterprise service clients based on the service metadata in the WSDL documents of a plurality of enterprise services and a WSDL list file. For each enterprise service, an enterprise service client is generated and stored in a folder. The plurality of enterprise service clients includes client 512, client 514, client 516, and client 518. Each of these clients represents a folder on the file system 305 with compiled client artifacts such as class files and XML documents. Client generator 510 also compiles the stored client artifacts in the folders of the generated enterprise service clients.

Test framework 505 includes a client configurator 520 component that configures the plurality of enterprise service clients to access the server systems hosting the corresponding enterprise services. Client configurator 520 includes the configured versions of the plurality of enterprise service clients generated by client generator 510. The configured clients include config_client 522, config_client 524, config_client 526, and config_client 528. The configuration of the enterprise service clients specifies which enterprise services will be invoked. Test framework 505 also includes a client invoker 530 component that invokes the appropriate enterprise services by the plurality of configured enterprise service clients. The invocation of the plurality of enterprise services includes obtaining real test data 545 from WSDL list file 540 that stores the collected real test data 545. In various embodiments, the WSDL list file 540 can be stored on the file system as a folder containing a set of subfolders representing sets of real test data 545 per enterprise service. Thus, each subfolder may include at least one set of real test data for an enterprise service. The client invoker 530 loads the real test data 545 from the WSDL list file 540 and maps the real test data 545 to the input and output parameters of the configured enterprise service clients. After the input and output parameters are filled in the enterprise service clients requests, the client invoker 530 invokes the corresponding enterprise services one by one.

Figure 6:
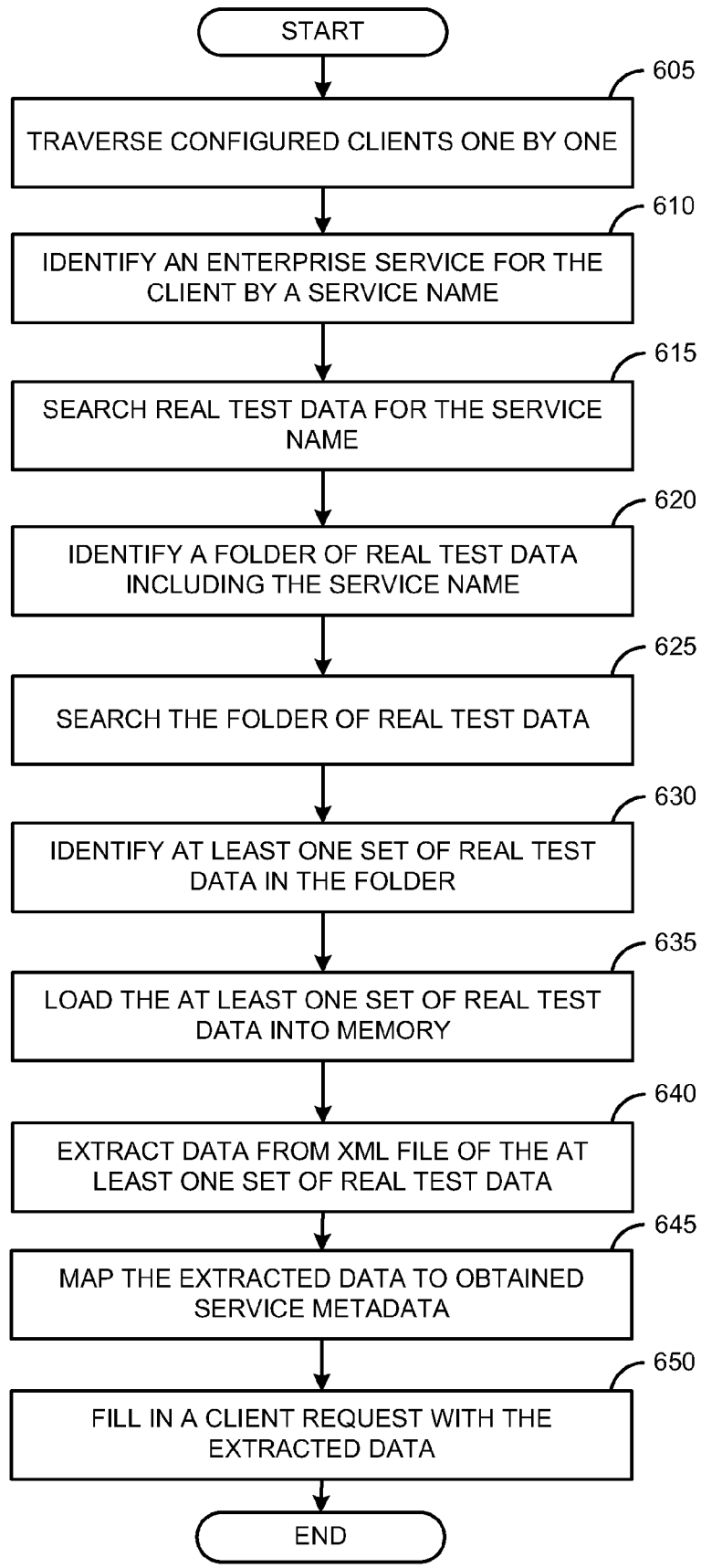
FIG. 6 is a flow diagram illustrating a method for mapping a set of real test data to the service metadata extracted from the WSDL document, according to an embodiment.

FIG. 6 is a flow diagram illustrating a method for mapping a set of real test data to the service metadata extracted from the WSDL document, according to an embodiment. In various embodiments, at block 605, the configured clients are traversed one by one by the client invoker 530 (e.g., config_client 522, config_client 524, config_client 526, and config_client 528). The client invoker 530 checks the service name specified in each configured client when the client was generated. The service name is unique; it corresponds to the name of the enterprise service for which the client was generated. At block 610, the enterprise service for a given enterprise service client is identified by the service name. Then, at block 615, the real test data 545 is searched in, folder by folder, for the same service name by the client invoker 530. At block 620, a folder of the real test data 545 including the service name is identified. At block 625, the identified folder is searched by the client invoker 530 for the collected set or sets of real test data. At block 630, at least one set of real test data is identified in the folder.

At block 635, the identified set or sets of real test data is loaded into memory. If there is more than one set of real test data 545, the client invoker loads the first set of real test data in a non-persistent memory of the client or server system where the test framework is hosted and invokes the enterprise service, then the next set of real test data, and so on. In some embodiments, the real test data 545 is stored as XML files and when the client invoker 530 identifies the XML file with the real test data for the given enterprise service, the client invoker 530 loads the XML file in the memory using an application programming interface (API). The API loads the real test data from the XML file in the memory. At block 640, operations, parameters of the operations, and values of the parameters are extracted from the XML file of the identified real test data. At block 645, the extracted data (operations, parameters of the operations, and values of the parameters) is mapped to the data of the operations created during generation of the client obtained from the service metadata. The mapping is performed by the service name, as the service name corresponding to the identified real test data is the same as the service name obtained from the WSDL metadata during generation of the enterprise service client. Thus, the operations and the parameters obtained from the metadata of the WSDL file of the enterprise service are mapped to the same operations and parameters of the identified real test data. At block 650, a client request is filled in with the extracted data and sent to the server system hosting the enterprise service.

In an exemplary scenario, "String S2 echo(String S1)" is an operation "echo" as defined in the service metadata of the WSDL file. The operation expects input data of type String "S1" and output data of type String "S2". In a graphical representation of the client using user interfaces, this functionality may be presented by a field in a graphical user interface (GUI) expecting the user to type in some input data of type String. Instead waiting for the user to type in some input data, the test framework automatically obtains needed input and output values from the loaded real test data of the XML file in the memory. Table 1 illustrates a portion of the XML file describing the operation "echo" with real test data values for the input and output data.

TABLE 1

| XML with real test data |
|---|
| <ECHO><br>  <S1><br>    SAP<br>  </S1><br>  <S2><br>    SAP<br>  </S2><br></ECHO> |

The test framework has to obtain the values of the input and output data (parameters) from the XML file, this is "SAP" and "SAP". The API of the test framework that helps loading the real test data from the XML file, extracts the input and output data and fills them in directly in the memory. When all needed input data is loaded and filled in the memory, the test framework is ready to invoke the corresponding enterprise service with the one or more operations. The client request invoking the enterprise service is sent to the server system hosting the enterprise service. This server system processes the request by executing the business logic of the enterprise service. Then, the server system will return a result. In case of the example with operation "echo", the server system will return "SAP" as output data. The output data is sent to the test framework and the enterprise service client that sent the request initially.

In some embodiments, the test framework checks if the returned output values correspond to the output data values extracted from the real test data 545 of the XML file. If the values are the same, then the invocation of the enterprise service from the client is considered as successful. In other embodiments, the real test data 545 may not specify the output data values of the operations. In that case, the test framework checks if the returned result is of the appropriate type, e.g., if it is of type String. If so, the invocation of the enterprise service from the client is considered also as successful.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
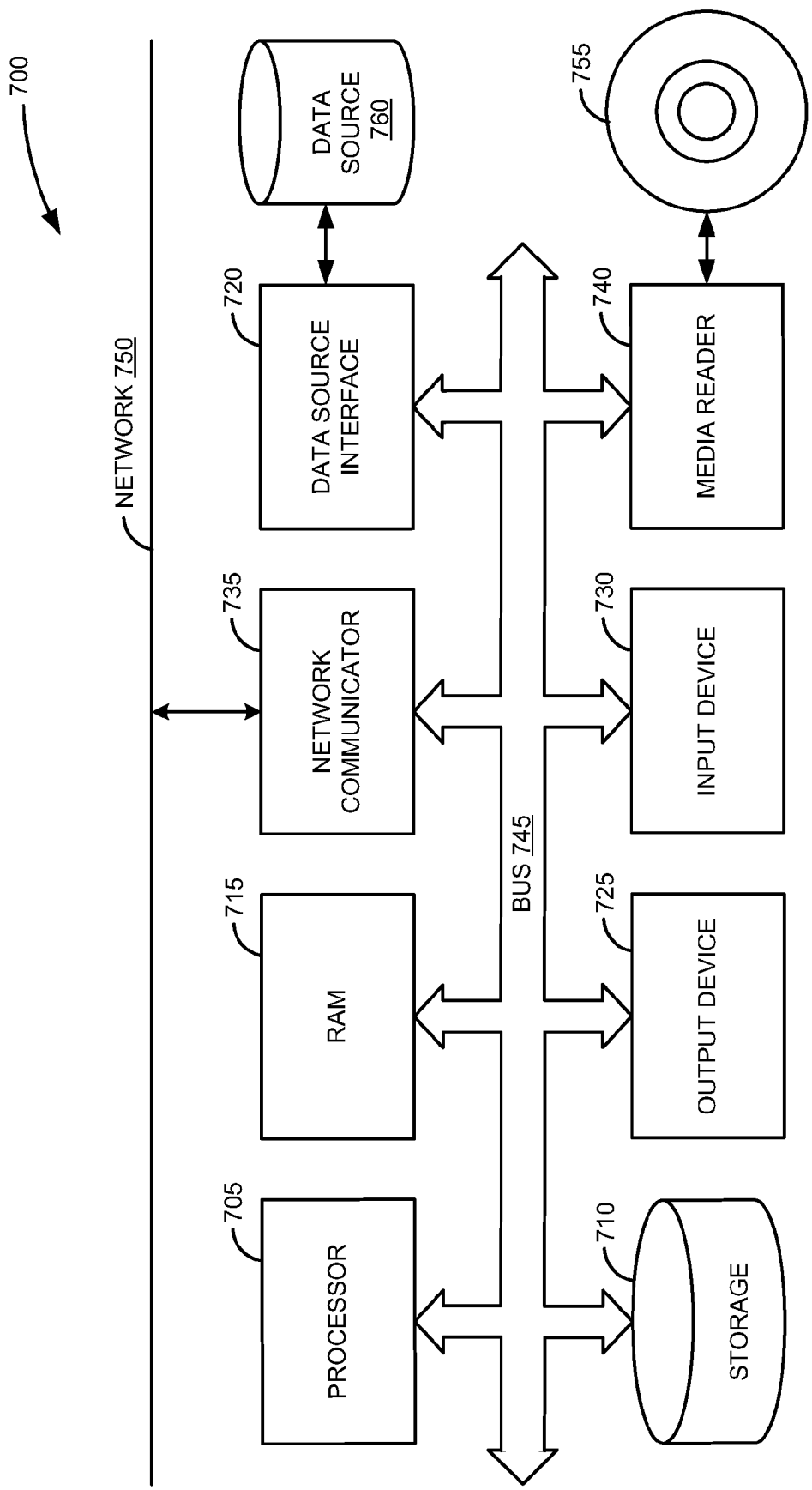
FIG. 7 is a block diagram illustrating an exemplary computer system 700.

FIG. 7 is a block diagram illustrating an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be access via one or more abstraction layers implemented in hardware or software. For example, the data source 760 may be access by network 750. In some embodiments the data source 760 may be accessed via an abstraction layer, such as, a semantic layer.

A data source 760 is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive a WSDL list file that includes, at least a WSDL URL that points to a WSDL document of an enterprise service, at least one set of real test data for the enterprise service, and access data to a server system hosting the enterprise service, wherein the at least one set of real test data is business data that proved to be correct in a plurality of real business scenarios and returns an expected result, and wherein the real test data is collected during execution of the plurality of real business scenarios and stored in a separate XML file;
   generate an abstract client entity representing a client based on service metadata obtained from the WSDL document of the enterprise service, wherein the service metadata includes a set of input data parameters and a set of output data parameters;
   automatically configure the abstract client entity based on the service metadata;
   transform and save the abstract client entity as the client to connect to the server system hosting the enterprise service via the access data from the WSDL list file;
   load in memory the at least one set of real test data from the WSDL list file for the enterprise service;
   map in a client request the loaded at least one set of real test data from the WSDL list file to the set of input data parameters and the set of output data parameters from the service metadata; and
   invoke with the client request the enterprise service from the transformed client to test compatibility between the enterprise service and the client based on the mapped at least one set of real test data.

2. The article of manufacture of claim 1, wherein the at least one set of real test data is collected during a successful execution of the enterprise service.

3. The article of manufacture of claim 1, wherein the access data includes at least: a host of the server system, a port of the server system, a user name, and a password to access the server system.

4. The article of manufacture of claim 1, further comprising instructions to cause the computer to:
   store client artifacts in a folder on a file system, wherein the client artifacts include a set of files; and
   compile the client artifacts to generate an abstract entity of the client.

5. The article of manufacture of claim 1, further comprising instructions to cause the computer to:
   search the WSDL list file to identify a set of real test data that includes a service name specified in the obtained service metadata of the WSDL document;
   identify the at least one set of real test data that includes the service name specified in the obtained service metadata, wherein the at least one set of real test data is described in the separate XML file; and
   load the separate XML file in the memory.

6. The article of manufacture of claim 5, wherein the separate XML file includes at least: the service name of the enterprise service, at least one operation of the enterprise service, and an input data parameter of the at least one operation.

7. The article of manufacture of claim 6, further comprising instructions to cause the computer to:
   extract the at least one operation and a value of the input data parameter from the separate XML file;
   map the extracted at least one operation to the obtained service metadata of the WSDL document; and
   fill in the client request to the server system hosting the enterprise service with the extracted value of the input data parameter from the separate XML file.

8. A computerized method comprising:
   receiving a WSDL list file that includes, at least a WSDL URL that points to a WSDL document of an enterprise service, at least one set of real test data for the enterprise service, and access data to a server system hosting the enterprise service, wherein the at least one set of real test data is business data that proved to be correct in a plurality of real business scenarios and returns an expected result, and wherein the real test data is collected during execution of the plurality of real business scenarios and stored in a separate XML file;
   generating an abstract client entity representing a client based on service metadata obtained from the WSDL document of the enterprise service, wherein the service metadata includes a set of input data parameters and a set of output data parameters;
   automatically configuring the abstract client entity based on the service metadata;
   transforming and saving the abstract client entity as the client to connect to the server system hosting the enterprise service via the access data from the WSDL list file;
   loading in memory the at least one set of real test data from the WSDL list file for the enterprise service;
   mapping in a client request the loaded at least one set of real test data from the WSDL list file to the set of input data parameters and the set of output data parameters from the service metadata; and
   invoking with the client request the enterprise service from the transformed client to test compatibility between the enterprise service and the client based on the mapped at least one set of real test data.

9. The method of claim 8, wherein the at least one set of real test data is collected during a successful execution of the enterprise service.

10. The method of claim 8, wherein the access data includes at least: a host of the server system, a port of the server system, a user name and a password to access the server system.

11. The method of claim 8, further comprising:
   storing client artifacts in a folder on a file system, wherein the client artifacts include a set of files; and
   compiling the client artifacts to generate an abstract entity of the client.

12. The method of claim 8, further comprising:
   searching the WSDL list file to identify a set of real test data that includes a service name specified in the obtained service metadata of the WSDL document;
   identifying the at least one set of real test data that includes the service name specified in the obtained service metadata, wherein the at least one set of real test data is described in the separate XML file; and
   loading the separate XML file in the memory.

13. The method of claim 12, wherein the separate XML file includes at least: the service name of the enterprise service, at least one operation of the enterprise service, and an input data parameter of the at least one operation.

14. The method of claim 13, further comprising:
   extracting the at least one operation and a value of the input data parameter from the separate XML file;
   mapping the extracted at least one operation to the obtained service metadata of the WSDL document; and
   filling in the client request to the server system hosting the enterprise service with the extracted value of the input data parameter from the separate XML file.

15. A system comprising:
   a processor;
   a memory in communication with the processor, the memory comprising:
      a WSDL list file folder storing at least a WSDL URL that points to a WSDL document of an enterprise service, at least one set of real test data for the enterprise service, and access data to a server system hosting the enterprise service, wherein the at least one set of real test data is business data that proved to be correct in a plurality of real business scenarios and returns an expected result, and wherein the real test data is collected during execution of the plurality of real business scenarios and stored in a separate XML file; and
      a test framework to test compatibility between the enterprise service and a client based on the at least one set of real test data, the test framework comprising:
         a client generator that generates an abstract client entity representing the client for the enterprise service based on service metadata obtained from the WSDL document of the enterprise service, wherein the service metadata includes a set of input data parameters and a set of output data parameters;
         a client configurator that configures the generated abstract client entity based on the service metadata; transform and save the abstract client entity into a configured client, wherein the configuration includes specifying the access data to the server system hosting the enterprise service; and
         a client invoker that loads into a non-persistent memory the at least one set of real test data from the WSDL list file, maps in a client request the loaded at least one set of real test data from the WSDL list file to the set of input data parameters and the set of output data parameters from the service metadata, and invokes the enterprise service with the mapped at least one set of real test data.

16. The system of claim 15, wherein the access data includes at least a host of the server system, a port of the server system, a user and a password to connect to the server system.

17. The system of claim 15, wherein the at least one set of real test data is described in the separate XML file stored in the WSDL list file.

18. The system of claim 17, wherein the separate XML file includes at least a service name of the enterprise service, at least one operation of the enterprise service, and an input data parameter of the at least one operation.

19. The system of claim 18, wherein the client invoker extracts the at least one operation and a value of the input data parameter from the separate XML file, maps the extracted at least one operation to the obtained service metadata of the WSDL document, and fills in a request of the client to the server system hosting the enterprise service with the extracted value of the input data parameter from the separate XML file.

20. The system of claim 15, wherein the client generator stores a set of files in a folder in response to generating the client and compiles the set of files to generate an abstract entity of the client.

\* \* \* \* \*